Dec. 12, 1950      P. M. MUELLER      2,533,605
APPARATUS FOR WELDING SLABS
Filed Oct. 8, 1945      14 Sheets-Sheet 1

INVENTOR
Paul M. Mueller
by his attorneys
Stebbins, Blenko & Webb

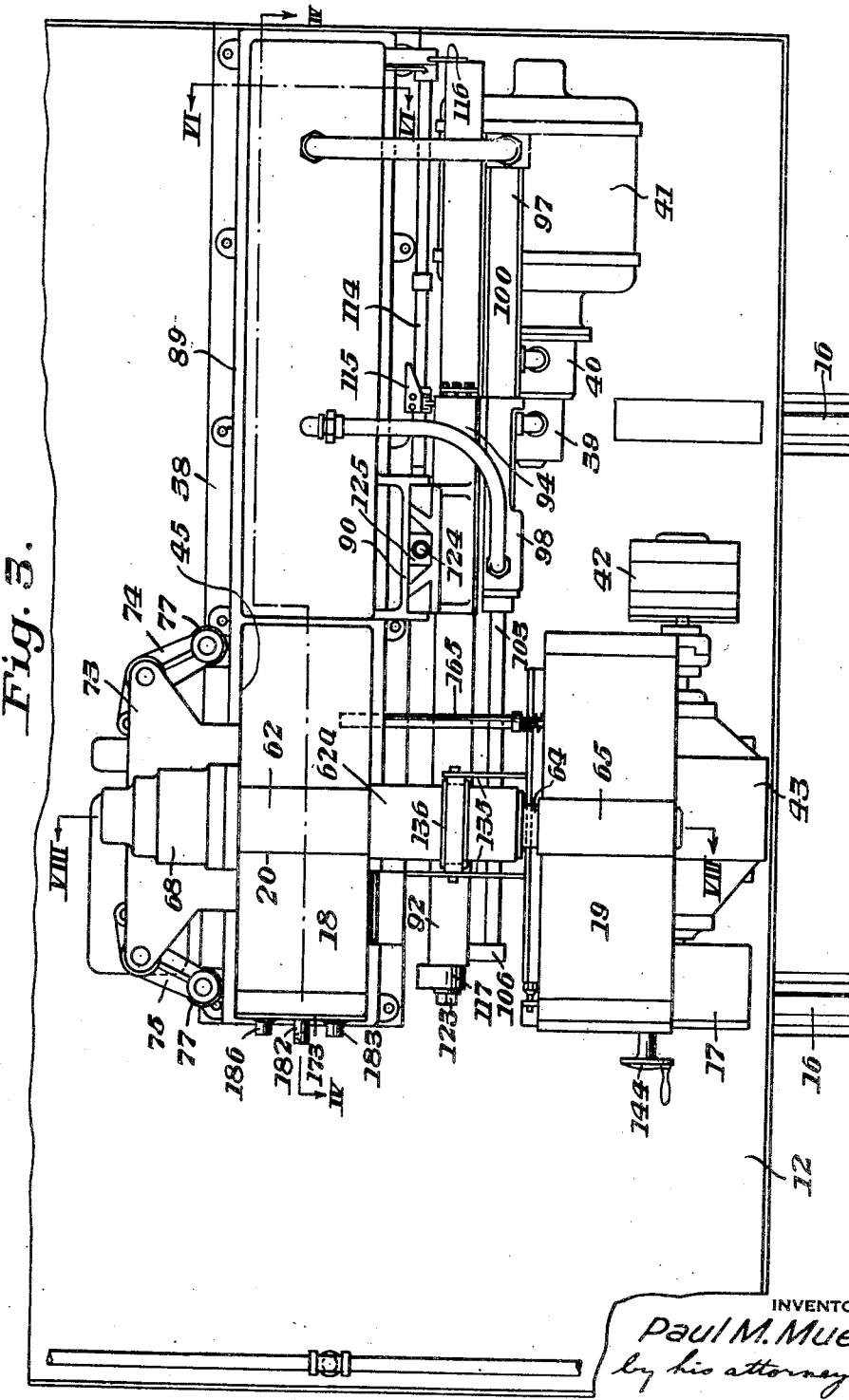

Dec. 12, 1950 P. M. MUELLER 2,533,605
APPARATUS FOR WELDING SLABS
Filed Oct. 8, 1945 14 Sheets-Sheet 3

INVENTOR
Paul M. Mueller
by his attorneys
Stebbins, Blenko & Webb

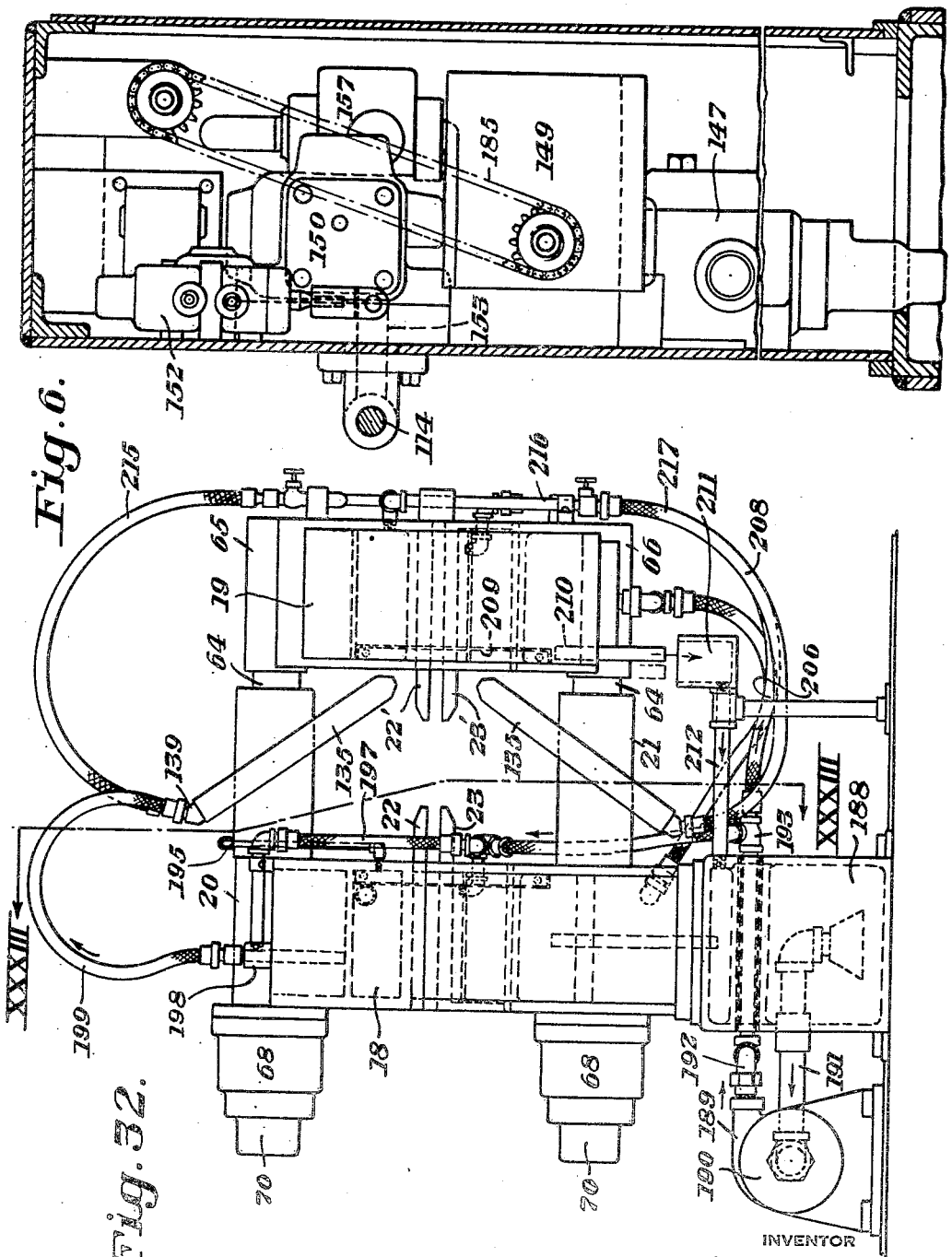

Dec. 12, 1950 P. M. MUELLER 2,533,605
APPARATUS FOR WELDING SLABS
Filed Oct. 8, 1945 14 Sheets-Sheet 5
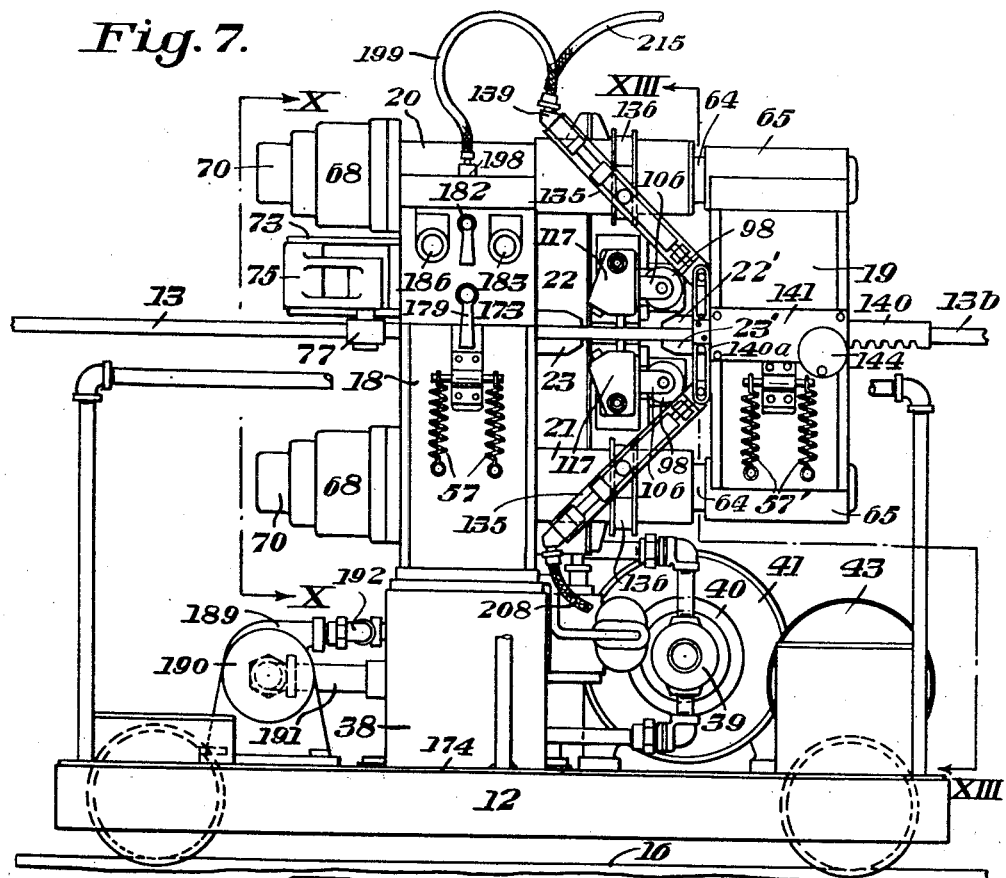
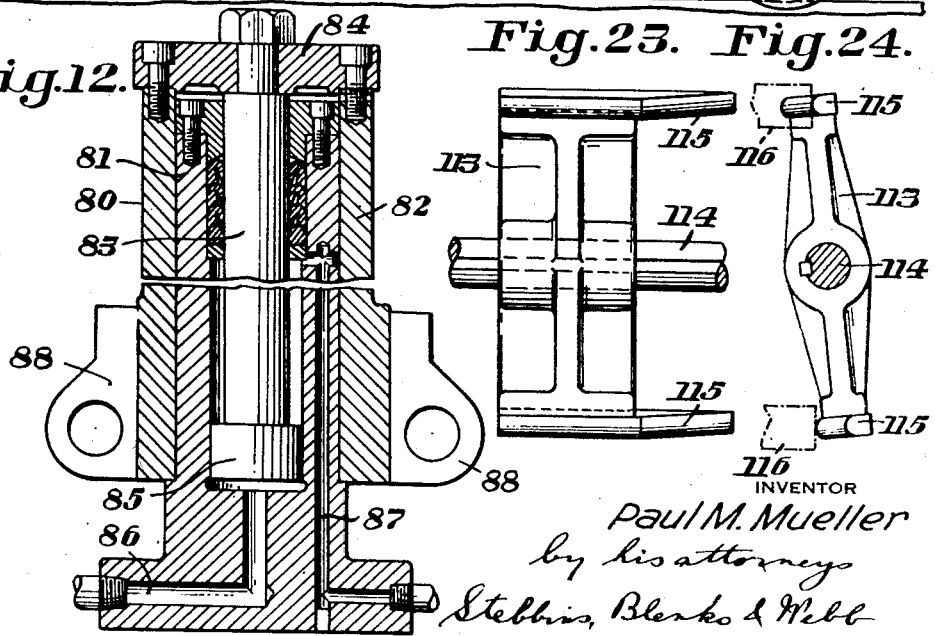
INVENTOR
Paul M. Mueller
by his attorneys
Stebbins, Blenko & Webb

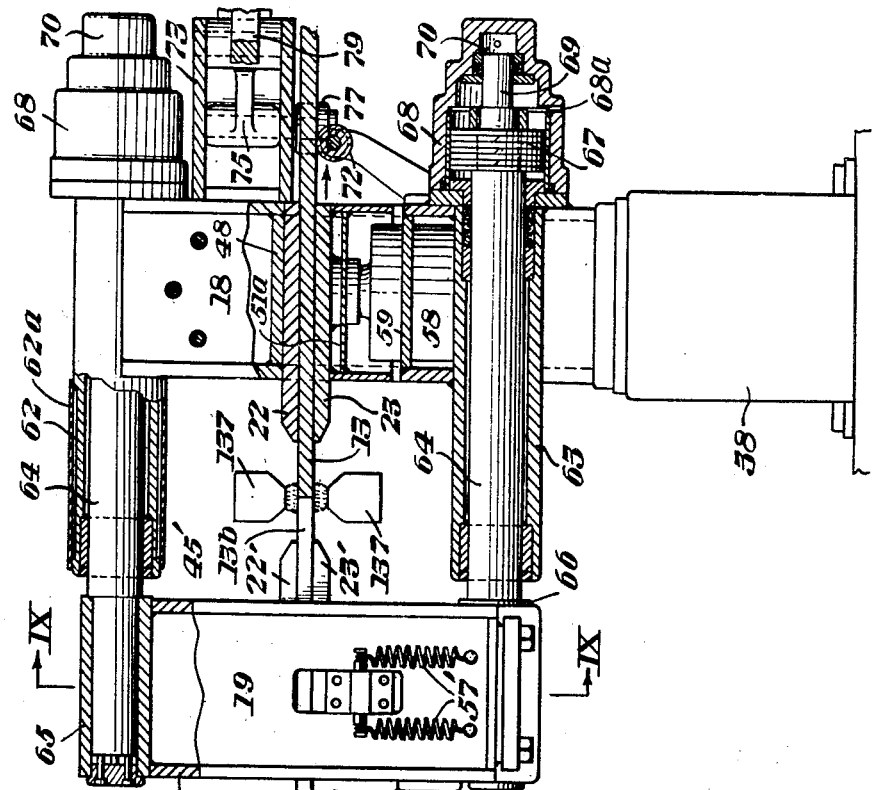

Dec. 12, 1950 P. M. MUELLER 2,533,605
APPARATUS FOR WELDING SLABS
Filed Oct. 8, 1945 14 Sheets-Sheet 7

INVENTOR
Paul M. Mueller
by his attorneys

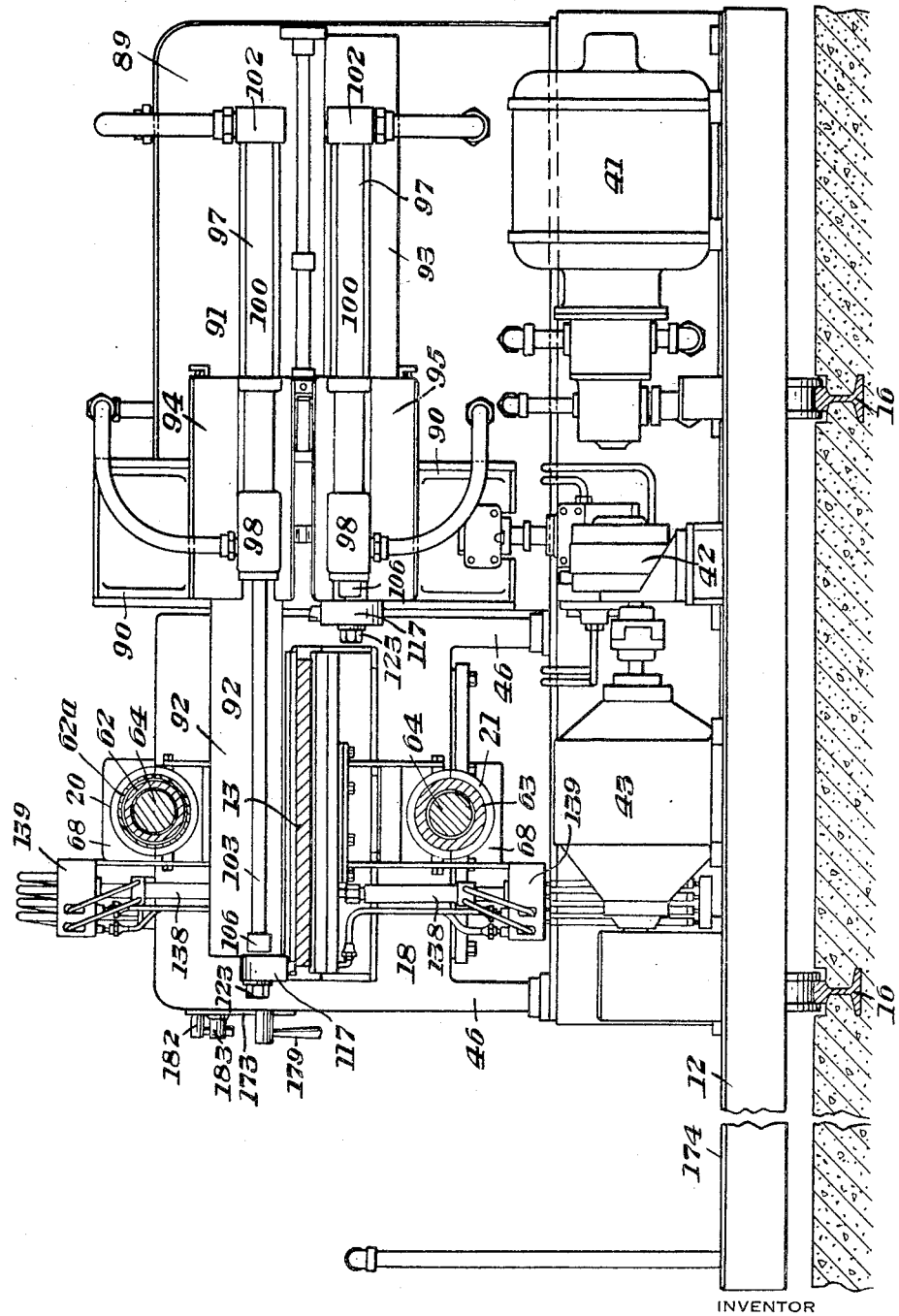

Dec. 12, 1950 P. M. MUELLER 2,533,605
APPARATUS FOR WELDING SLABS
Filed Oct. 8, 1945 14 Sheets-Sheet 9
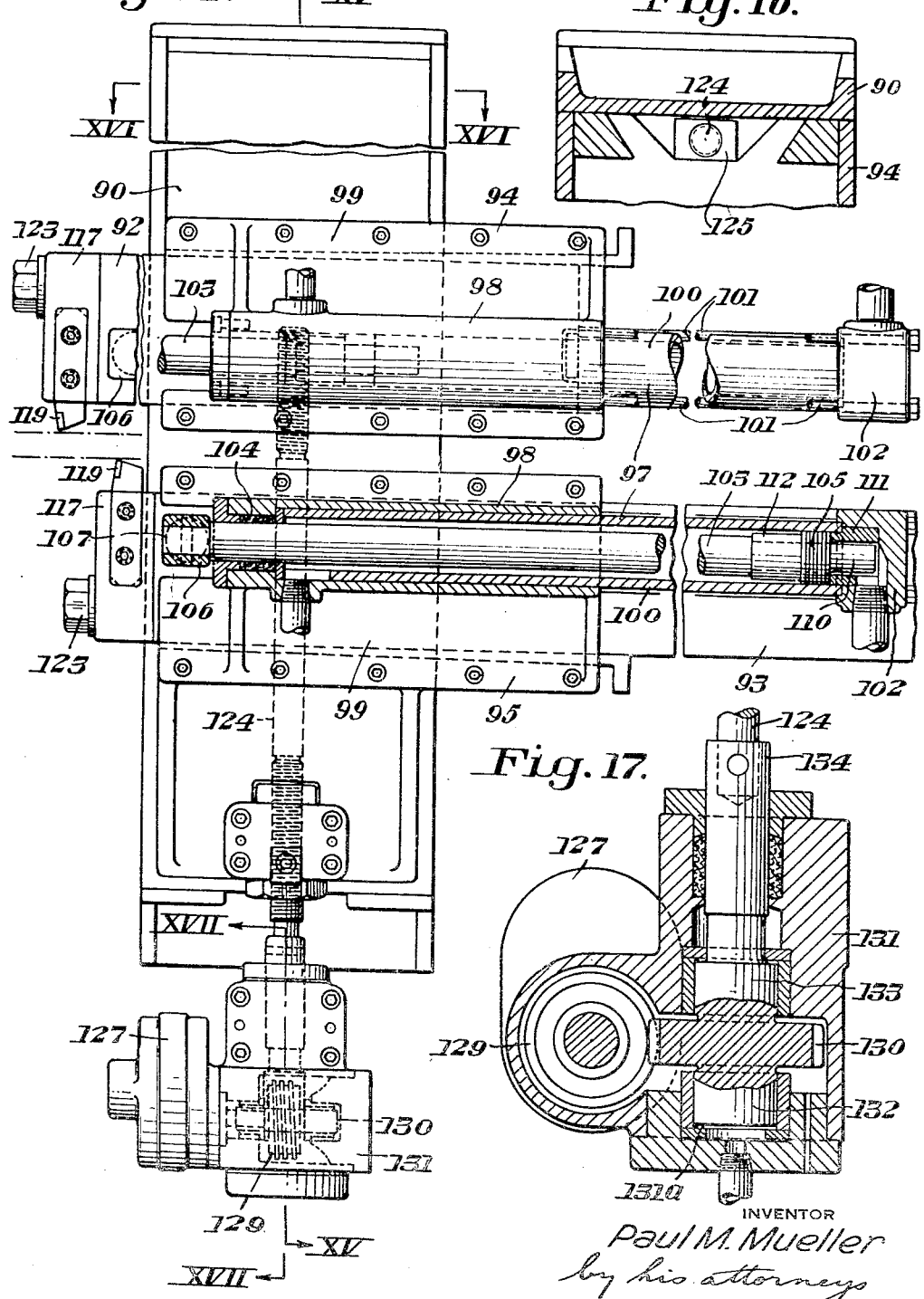
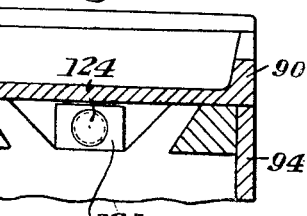
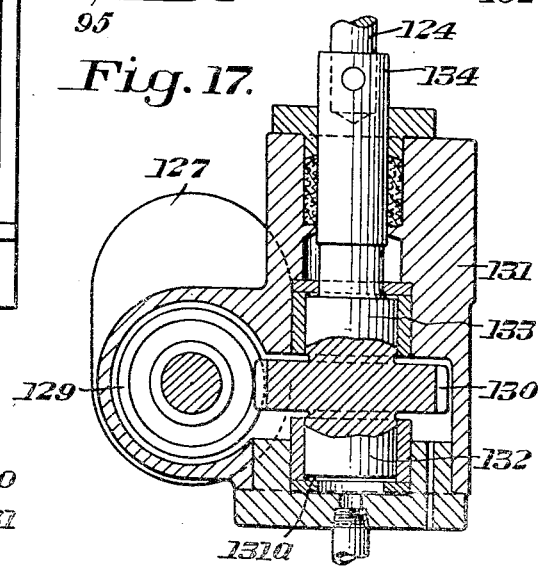
INVENTOR
Paul M. Mueller
by his attorneys
Stebbins, Blenko & Webb Dec. 12, 1950        P. M. MUELLER        2,533,605
APPARATUS FOR WELDING SLABS
Filed Oct. 8, 1945        14 Sheets-Sheet 10

INVENTOR
Paul M. Mueller
by his attorneys
Stebbins, Blenko & Webb

Dec. 12, 1950 P. M. MUELLER 2,533,605
APPARATUS FOR WELDING SLABS
Filed Oct. 8, 1945 14 Sheets-Sheet 11
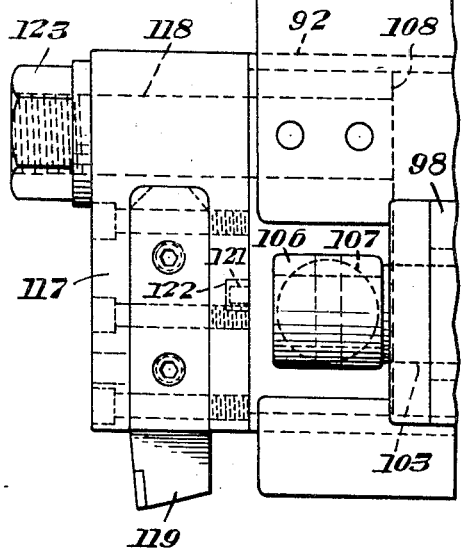
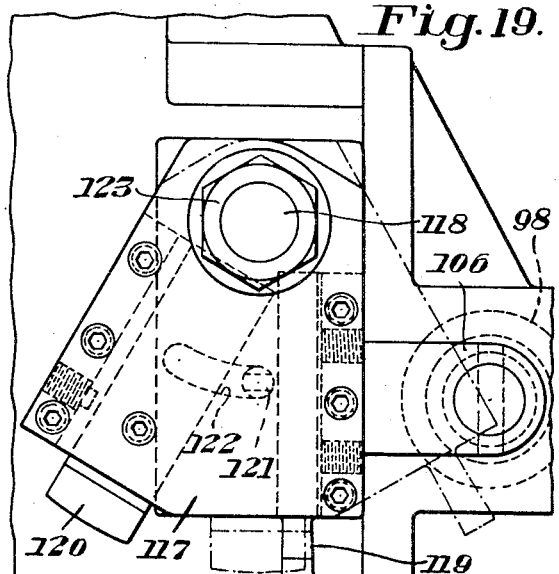
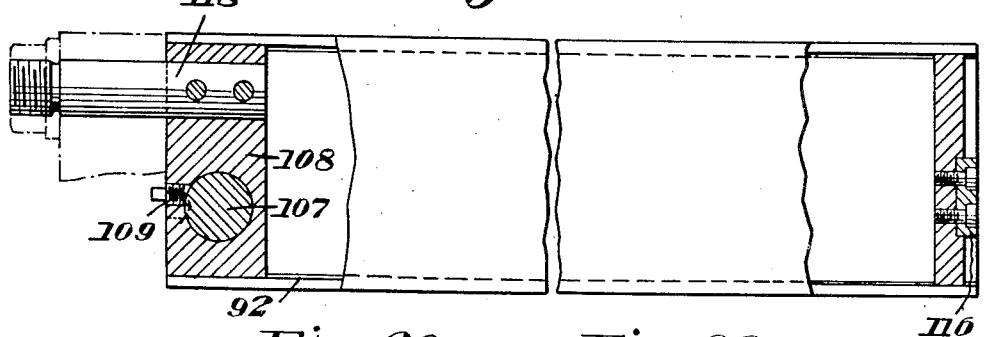
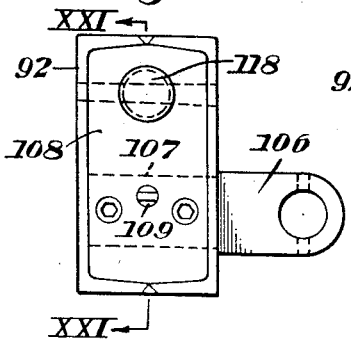
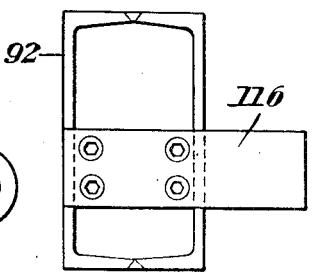
INVENTOR
Paul M. Mueller
by his attorneys
Stebbins, Blenko & Webb

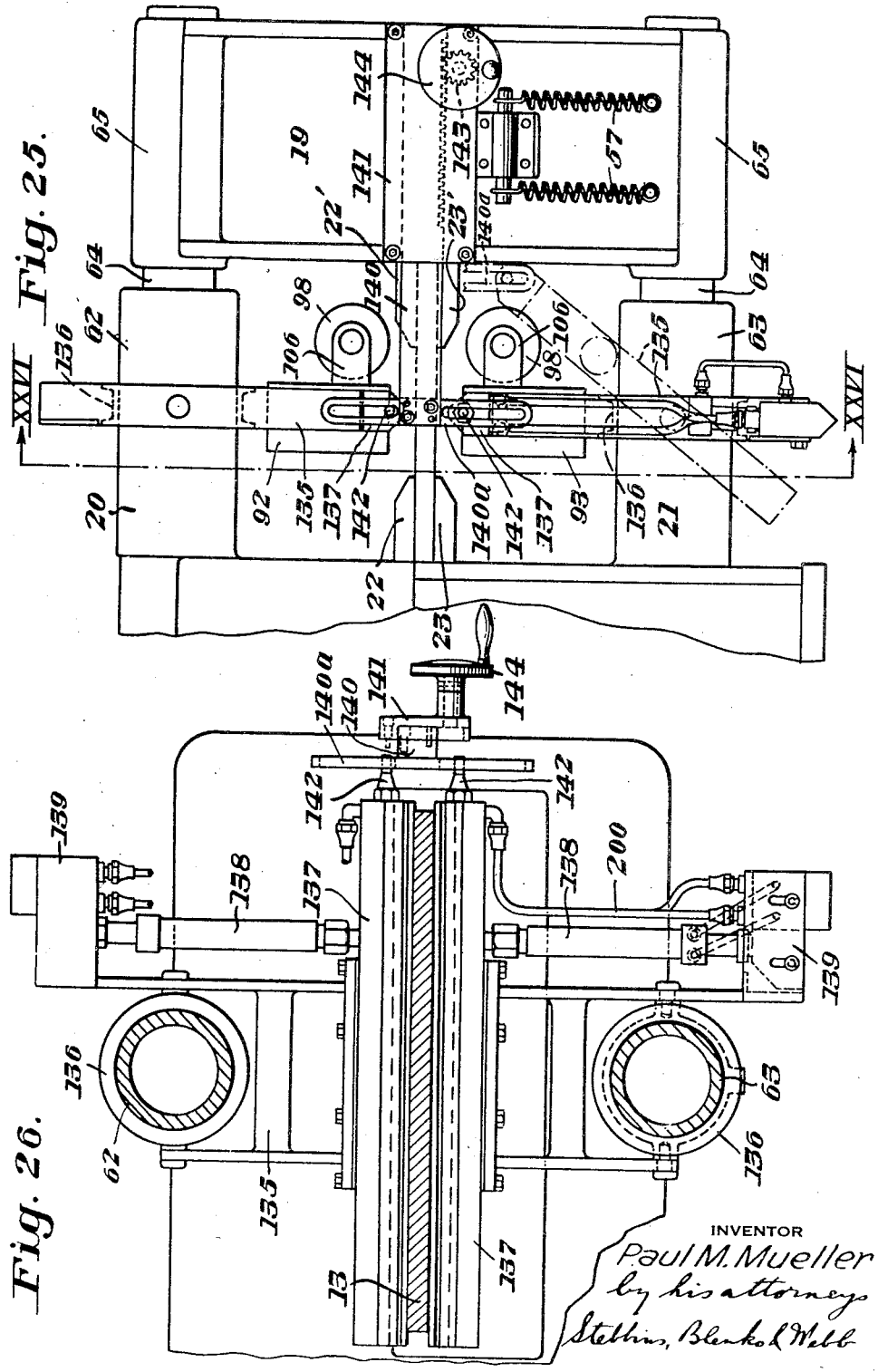

Dec. 12, 1950 P. M. MUELLER 2,533,605
APPARATUS FOR WELDING SLABS
Filed Oct. 8, 1945 14 Sheets-Sheet 13

Fig. 31.

INVENTOR
Paul M. Mueller
by his attorneys
Stebbins, Blenko & Webb

Dec. 12, 1950   P. M. MUELLER   2,533,605
APPARATUS FOR WELDING SLABS
Filed Oct. 8, 1945   14 Sheets-Sheet 14
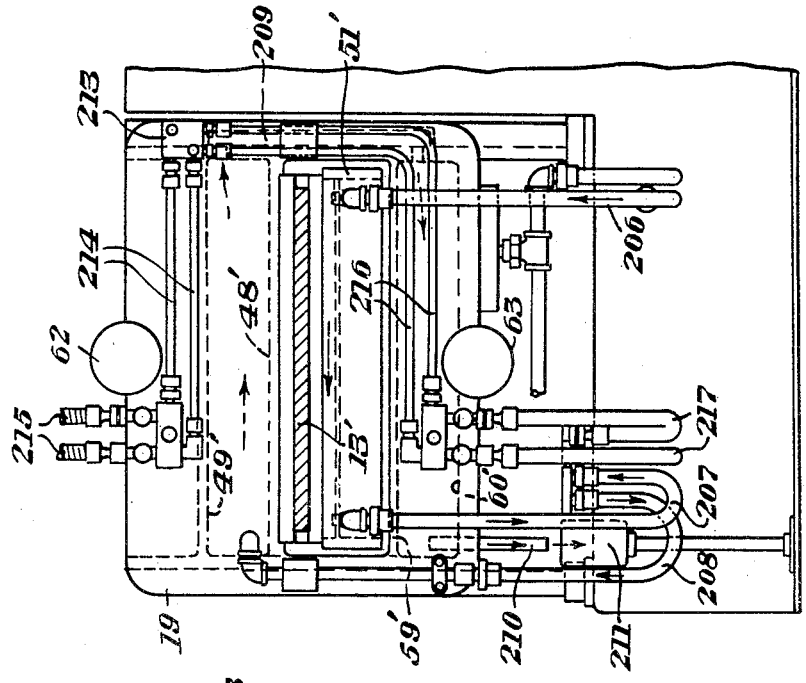
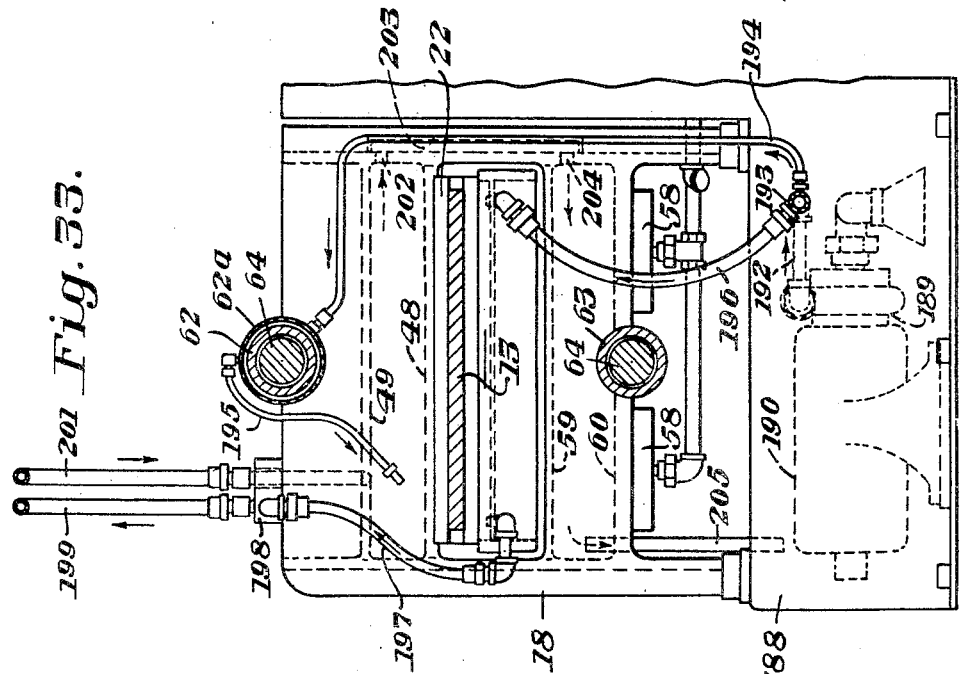
INVENTOR
Paul M. Mueller
by his attorneys
Stebbins, Blenko & Webb Patented Dec. 12, 1950

2,533,605

UNITED STATES PATENT OFFICE 2,533,605

APPARATUS FOR WELDING SLABS

Paul M. Mueller, Rome, N. Y., assignor to Blaw-Knox Company, Pittsburgh, Pa., a corporation of New Jersey Application October 8, 1945, Serial No. 620,879

3 Claims. (Cl. 29—33)

This invention relates generally to welding and, in particular, to a method and apparatus for welding, together, end-to-end, successive slabs or bars of metal to form a continuous workpiece for further processing, e. g., rolling to finished gauge.

It is now common practice to process metal strip continuously by feeding a workpiece of indefinite length and single thickness through the processing apparatus. Ferrous strip, for example, is hot-rolled from large slabs up to 6" or 8" in thickness by several feet in length and width, to an intermediate gage and coiled. The resulting coils of strip are joined by welding for further processing, such as pickling and reduction to final gage by cold-rolling. Apparatus is known for joining such lengths while one of them continues to travel. In the usual form of such apparatus, a loop of slack is accumulated at the entrance to the processing line, to permit continued travel of the forward portion of the strip in process while the next succeeding piece is being welded to its arrested trailing end. At the intermediate gage, e. g., approximately .065", the strip bends easily to permit the accumulation of such a loop of slack. It has also been proposed to join lengths of ferrous strip of intermediate gage at which it forms loops readily, by a traveling spot welder which moves with the strip for a predetermined distance in its path. With such apparatus the welded joints have to be cut out since they cannot be passed between the cold-mill rolls.

In rolling strip of certain non-ferrous metals and alloys such as copper and brass, it is desirable to cast the metal into relatively small masses such as slabs having a thickness of about 2", a length of about 5' and a width of about 2'. These slabs are subjected to breakdown rolling, either hot or cold, to reduce them to a thickness of about ½". There is a definite limit to the length and width of the partially reduced slab for easy handling, i. e., around 20'. This necessitates frequent welds to produce a work piece of indefinite length suitable for economical continuous processing. The thickness of the slabs is such, furthermore, that their rigidity precludes forming a loop of slack to permit welding successive lengths together while the leading length continues to move. Thus the use of a welder which travels with the workpiece is required. The thickness of the slabs introduces a further difficulty in that the time required to heat their abutting ends to welding temperature is much greater than in the case of the relatively thin ferrous strip. The heating of the ends to be welded and the subsequent cooling thereof must necessarily be progressive and this involves problems of internal stress and the resulting deformation such as buckling caused by differential thermal expansion. For certain types of welding, moreover, particularly that of Renner Patent 2,231,027, the ends of the pieces to be welded must be machined to a high degree of precision for practically perfect matching when abutted. The amount of scrap thus produced must be kept to a minimum because of the high cost of the metal per pound. The ends cannot be sheared with sufficient smoothness at the abutting surface as can the ferrous strip which is welded only at a much smaller thickness. In addition, the welding, as in all cases, leaves a bead or burr of flash which must be removed to permit processing of the weld in the same manner as the other portions of the slab. Only a limited time is available for performing all these operations at the usual speed of movement of the workpiece, unless the range of travel of the welder is prolonged, beyond practical limits.

I have invented a method and apparatus particularly adapted for joining successive slabs of such thickness that they do not bend to form a loop of slack, having provisions for machining the ends of the slabs to the required degree of accuracy and with a minimum of waste; heating them to welding temperature under controlled cooling conditions to limit internal stress; welding them together to form a joint homogeneous with the parent metal; and removing the flash, all within such a short space of time that the travel of the resulting workpiece at a rate satisfactory for subsequent processing will not be great enough to require an excessive amount of floor space. The apparatus of my invention is mounted on a car for traveling movement and is particularly adapted to produce a continuous workpiece suited for reduction by progressive step-by-step rolling as disclosed in Krause Patents 2,161,064 and 2,223,039, with continuous forward movement of the workpiece at low speed. The machining means comprises a pair of vertically spaced shapers working transversely of the slabs.

Further details, novel features and advantages of the invention will become apparent from the following complete description which refers to the accompanying drawings illustrating a preferred embodiment and practice. In the drawings, Figure 1 is a diagrammatic plan view showing the relation of the car-mounted welder to a conveyor for entering slabs thereinto and pinch-rolls for continuously advancing the workpiece formed by welding successive slabs together;

Figure 3 is a plan view of the car-mounted welder;

Figure 6 is a vertical section taken along the plane of line VI—VI of Figure 4;

Figure 7 is a side elevation of the welder;

Figure 8 is a longitudinal vertical section taken along the plane of line VIII—VIII of Figure 3, with parts in elevation, parts being omitted for clearness;

Figure 9 is a transverse section taken along the plane of line IX—IX of Figure 8;

Figure 12 is a horizontal section taken along the plane of line XII—XII of Figure 10;

Figure 13 is a transverse section taken along the plane of line XIII—XIII of Figure 7 showing parts in elevation;

Figure 14 is an elevation to enlarged scale of a portion of Figure 13, showing the hydraulic motor for one of the shaper rams in central vertical section;

Figure 16 is a horizontal section taken along the plane of line XVI—XVI of Figure 14;

Figure 17 is a vertical section taken along the plane of line XVII—XVII of Figure 14;

Figure 18 is an elevation of a portion of Figure 14 to enlarged scale;

Figure 19 is an end view of the parts shown in Figure 18;

Figure 20 is an elevation of the forward end of a shaper ram;

Figure 21 is a longitudinal section taken along the plane of line XXI—XXI of Figure 20 with a portion in elevation;

Figure 22 is an end elevation of the rear end of the shaper ram;

Figure 23 is an elevation of a reversing lever for controlling the shaper rams;

Figure 24 is an end view of the parts shown in Figure 23, the shaft being shown in section;

Figure 25 is an elevation showing a portion of Figure 7 to enlarged scale with parts omitted for the sake of clearness;

Figure 26 is a transverse section taken along the plane of line XXVI—XXVI of Figure 25;

Figure 31 is a diagram of the hydraulic control system for operating the various parts of the apparatus;

Figure 32 is an elevation of a portion of Figure 7 to enlarged scale, partly diagrammatic, showing the cooling system with parts omitted;

Figure 33 is a transverse section taken along the plane of line XXXIII—XXXIII of Figure 32; and Figure 34 is a view such as would be seen by looking on the apparatus of Figure 32 from the right.

Figure 1:
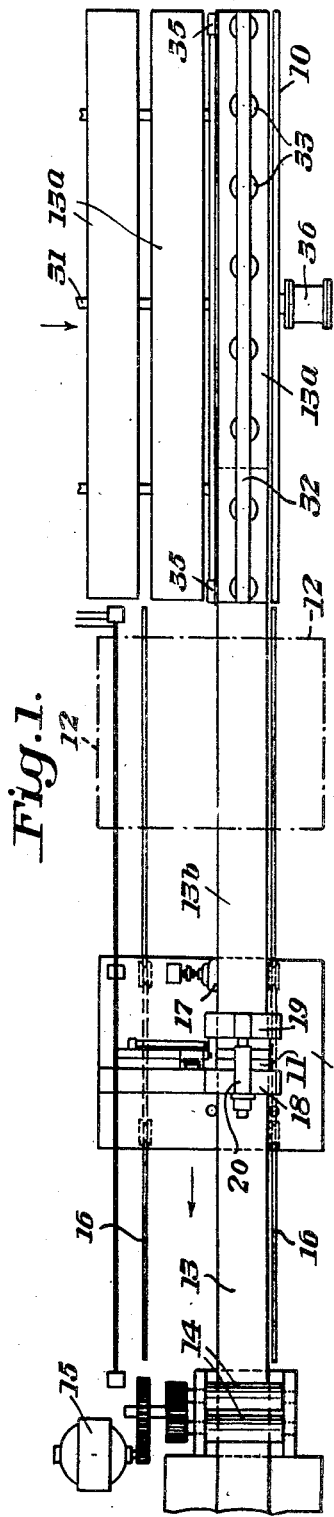

In the following description, the several principal features of the invention will be treated under separate headings as follows: (1) General Outline of the Apparatus; (2) The Apparatus for Disposing Successive Slabs in Position for Welding; (3) The Slab Clamping and Centering Means and Push-up Motors; (4) The Shaper Mechanism; (5) The Heating Means; (6) The Sequence of Operations; (7) The Hydraulic Power System; (8) The Centralized Control; (9) The Cooling System; (10) The Advantages of the Invention.

(1) *General outline of the apparatus (Figs. 1 and 2)*

An entry roller table 10 is adapted to feed slabs successively to a welder 11 mounted on a wheeled car 12 and adapted to travel with the trailing end of a workpiece 13 formed by welding successive slabs together, end-to-end. The workpiece is advanced at a substantially uniform rate by pinch-rolls 14 driven by a motor 15 through suitable gearing.

The car 12 travels on rails 16 between a position adjacent the table 10 (shown in chain lines) and a position adjacent the pinch-rolls. The car is pulled forward by the advancing piece. A motor 17 is mounted on the car for driving it in the reverse direction to position it for the start of a welding operation. The welder includes a frame 18 which is stationary relative to the car 12, and a frame 19 movably mounted on the stationary frame. Both frames, of course, move with the car as it is pulled forward by the workpiece. Hydraulic motors 20 and 21 extend horizontally from the stationary frame 18 and support the movable frame 19. The stationary and movable frames each have fixed and movable clamping members 22, 23 and 22', 23' respectively, adapted to grip the ends of successive slabs. A flexible hose 24 is suspended in loops by links 25 riding a messenger cable 26. The cable 26 extends between posts 27. The hose 24 is connected to suitable reservoirs 28 and 29 containing gases, such as oxygen and acetylene. The hose terminates at the right-hand post 27 and a post 30 on the car 12. Electric current is supplied to the car by any suitable connection, either a flexible cable, trolley or third rail.

(2) *Apparatus for disposing the successive slabs in position for welding (Figs. 1 and 2)*

Slabs such as those shown at 13a are brought from storage by any suitable means and placed on skids 31 adjacent the roller conveyor table 10. A lift beam 32 adapted to be suspended from an overhead crane is provided with suction cups 33 whereby it picks up a slab from the skids and places it on the roller table. The rollers on the table indicated at 34 may be idle or driven. The table is provided with alinement stops 35 on one side and a pusher cylinder 36 on the other. The cylinder is conveniently operated by air from the regular plant supply under the control of a manual valve, and may have an internal restoring spring. When a slab has been positioned on the table by the lift beam, the admission of air under pressure to the cylinder 36 causes its piston to push a slab laterally until it engages the stops 35. These stops are so positioned that when the slab engages them, it is accurately alined with the traveling workpiece 13 formed by the welding together of slabs previously delivered from the skids 31.

Figure 2:
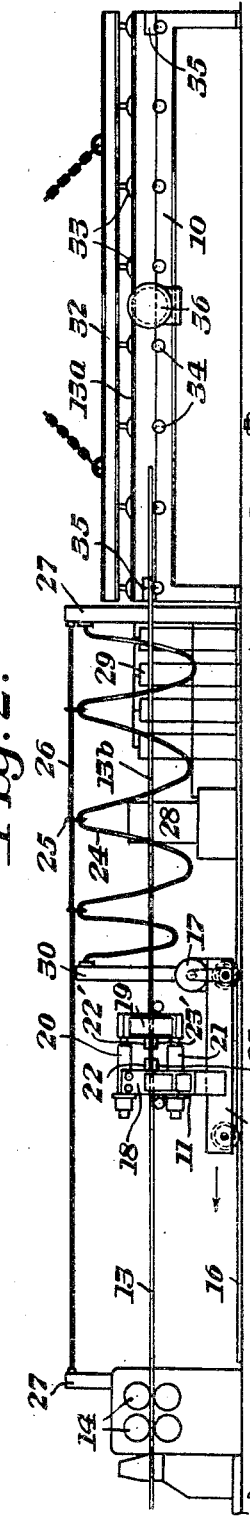
Figure 2 is a diagrammatic side elevation thereof.

The car 12 occupies the position shown in chain lines in Figure 1 at the start of an operating cycle, the trailing end of the workpiece 13 being gripped by the clamping members 22 and 23 of the stationary frame 18 and projecting slightly therebeyond. The slab on the table 10 is then advanced either manually or by driving the rollers 34, if drive means therefor are provided, so that the leading end of the slab on the table, e.g., 13b, is advanced to a position closely adjacent the trailing end of the workpiece 13. Preferably, the entering slab is caused to abut the previously welded slab.

(3) The slab clamping and centering means and push-up motors (Figs. 3, 4 and 10–12)

Figure 4:
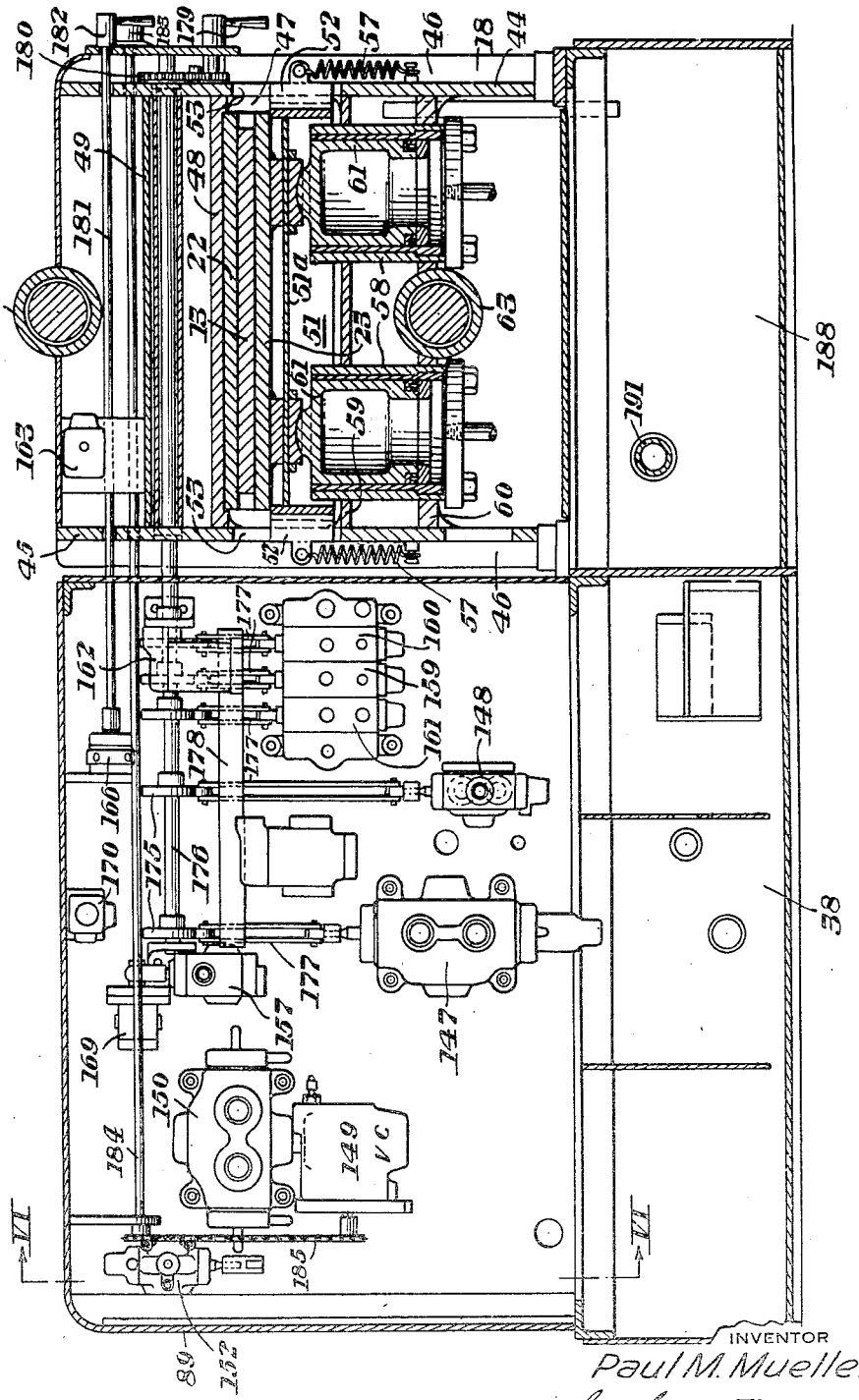
Figure 4 is a transverse section therethrough taken along the plane of line IV—IV of Figure 3.
Figure 11:
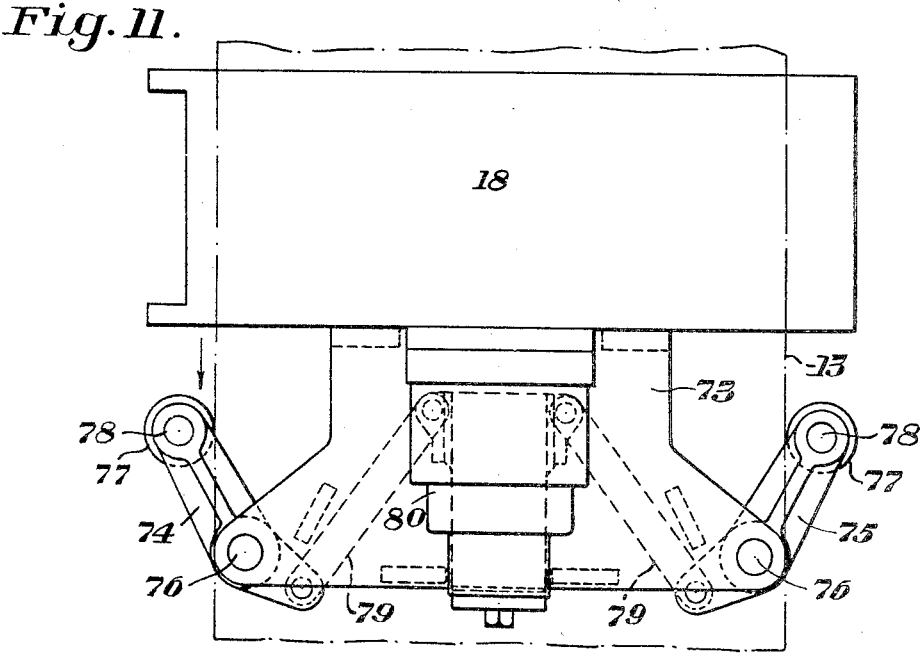
Figure 11 is a plan view of Figure 10.
Figure 10:
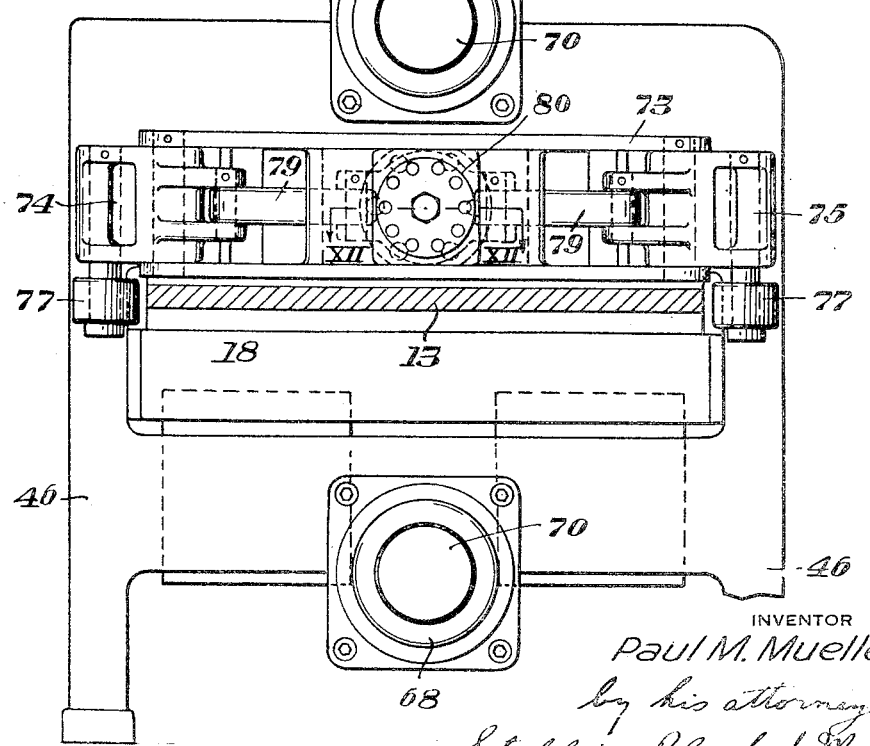
Figure 10 is a transverse section taken along the plane of line X—X of Figure 7 showing parts in elevation.

The stationary clamping frame 18 is mounted on a base 38 secured to the deck or floor of the car 12. The base 38 serves as a reservoir for operating fluid such as oil. Pumps 39 and 40 mounted on the car are driven by a motor 41 for supplying oil to various portions of the apparatus. A hydraulic motor 42 operates the reversing drive 17 through reduction gearing 43. The frame 18, as best shown in Figure 4, comprises spaced transverse plates 44 and 45 extending between columns or posts 46. The plates 44 and 45 have alined windows 47 therein. A horizontal plate or transom 48 extends between the side plates and posts at the level of the upper edge of the windows. A second horizontal plate 49 is spaced above the plate 48. The fixed clamping member 22 is secured to the lower surface of the plate 48.

A crosshead 51 fabricated from plate has a transverse horizontal plate 51a and end members 52 extending through slots 53 in the posts 46. The movable clamping member 23 is welded to the crosshead. Springs 57 secured to the end members 52 and to pins in the posts 46 exert a constant downward force on the crosshead. Cylinders 58 extend through and are carried on spaced parallel plates or transoms 59 and 60 extending between the side plates and the posts 46. Pistons 61 in the cylinders engage bearing blocks on the crosshead 51. On admission of oil under pressure to cylinders 58, the pistons cause the movable clamping member 23 to engage the slab 13 and press it firmly against the upper clamping member 22, against the tension of springs 57. The latter returns the crosshead to its lowermost position when the pressure of the oil in cylinders 58 is relieved.

The movable frame 19 is quite similar in construction to the frame 18, as shown in Figures 8 and 9 except that the side plates 44' and 45' and the posts 46' terminate adjacent the bottom horizontal plate 60', instead of extending downwardly to the level of the base 38. Corresponding parts of frame 19 are designated by the same numerals used for the stationary frame with a prime affixed thereto.

The clamping members 22, 23 and 22', 23' extend inwardly from the frames 18 and 19 and have intimate heat-exchange contact with the slabs on both sides throughout substantially the entire area thereof adjacent the ends to be welded. The extensive area of the clamps is much greater than that required merely to give good frictional engagement with the slabs and provides rapid and efficient transfer of heat from the latter during heating and cooling. They thus control the temperature of the slabs at various points across the width, and limit internal stress due to differential expansion. The clamping members are maintained at substantially uniform temperature by the cooling system to be described later. In this cooling system, the plates 48 and 49 define a water chamber in contact with the upper clamp of the frame 18. Plates 23 and 51a define a similar water chamber for the lower clamping member 23. Plates 59 and 60 provide a water-cooling chamber for the lower part of the frame.

The motors 20 and 21 include cylinders 62 and 63 carried by the frame 18 and extending normally to the side plates 44 and 45, the upper and lower edges thereof being notched to receive them. These cylinders serve as tubular guides or hollow beams slidably receiving rods 64 on which the movable frame 19 is actually carried. As shown in Figures 8 and 9, the frame 19 has sleeves 65 and 66 secured thereto coaxial with the cylinders 62 and 63 to accommodate the reduced ends of the rods 64. The cylinders 62 and 63 thus support the movable frame 19 in the manner of cantilever beams.

The cylinders 62 and 63 have bushings adjacent their ends in which the rods 64 are slidable. Pistons 67 on the rods cooperate with enlarged cylinders 68 secured to the cylinders 62 and 63. The ends of the rods 64 project beyond the pistons 67 and are reduced, as shown at 69, for reciprocation in reduced cylinders 70 carried on the cylinders 68. A drain hole 68a in each cylinder 68 between the pistons 67 and 69 permits the escape of oil leaking past the pistons. The cylinders 68 are the power cylinders for effecting the push-up of the slab 13b to weld it to the workpiece 13. The cylinders 70 are push-back cylinders for restoring the movable frame 19 to its original position. The space between the frames 18 and 19 is the welding zone. Supporting rollers 71 and 72 are journaled on brackets secured to the movable and stationary frames respectively. A water jacket 62a surrounds the portion of the cylinder 62 between the frames to prevent overheating thereof by the burners to be described later, for heating the abutting ends of the slabs to welding tmperature.

A bracket 73 projects horizontally from the frame 18 on the outlet side above the level of the roller 72. Levers 74 and 75 are pivoted on opposite sides thereof on vertical shafts 76. The outer ends of the levers have centering rollers 77 journaled on vertical shafts 78 adapted to engage the edges of the workpiece 13 to maintain it properly centered relative to the welder. The levers are actuated by links 79 pivoted to their inner ends and to a hydraulic cylinder 80 mounted in the bracket 73. As shown in Figure 12, the cylinder 80 comprises a fixed inner cylinder 81, an outer sleeve 82 slidable thereon, and a piston rod 83 extending into the inner cylinder from a head 84 secured to the sleeve 82. The rod 83 has a piston 85 thereon and fluid under pressure may be admitted to either side of the piston through passages 86 and 87. The sleeve 82 has ears 88 to which the links 79 are pivoted. It will be apparent that when the piston 85 is forced outwardly, the rollers 77 are brought inwardly to engage the edges of the workpiece. The rollers are normally maintained in such engagement with the workpiece but are retracted when first starting the latter. Inward movement of the piston causes the rollers to be retracted from the edges of the workpiece. Oil under pressure is supplied to the cylinder 81 under the control of a manual valve, as explained later.

(4) The shaper mechanism (Figs. 3, 7 and 13–24)

Figure 5:
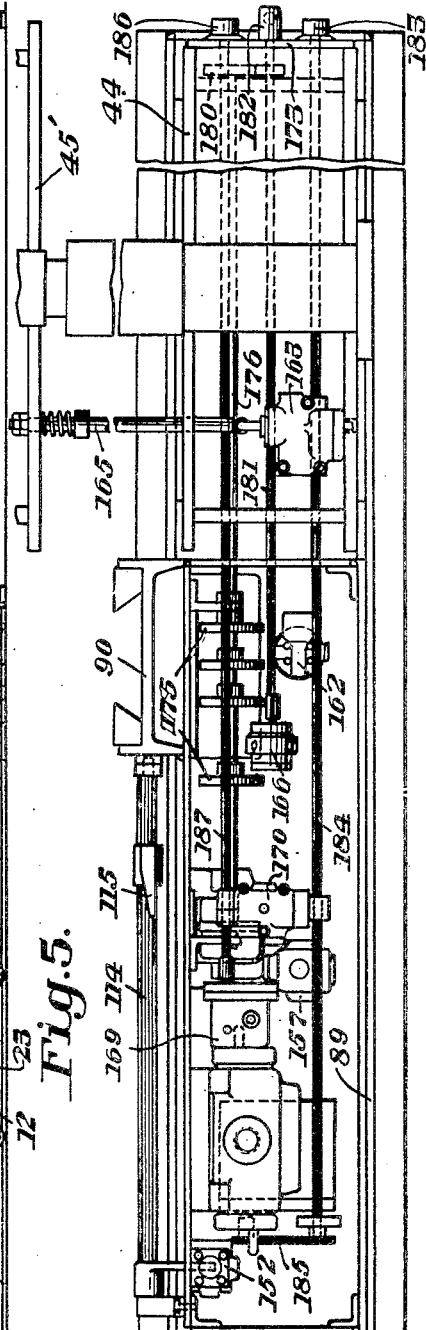
Figure 5 is a plan view of the apparatus shown in Figure 4 with the covers removed.
Figure 15:
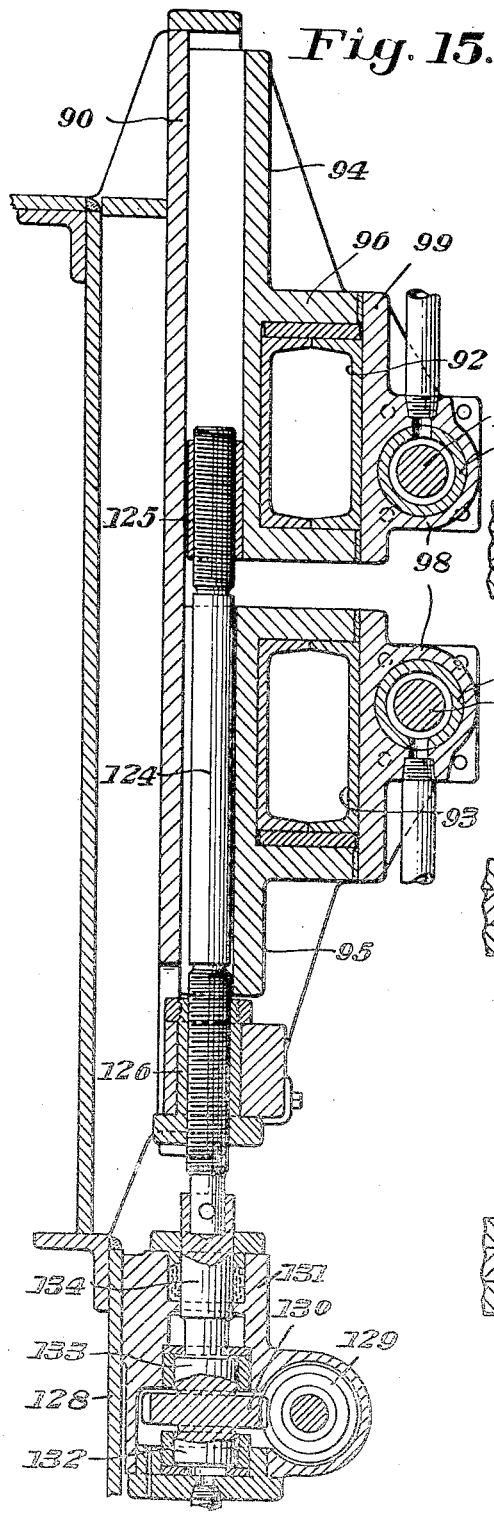
Figure 15 is a vertical section taken along the plane of line XV—XV of Figure 14.

As shown in Figures 4 and 5, a housing 89 extends laterally from the frame 18. This housing encloses control valves to be described in detail later. A column 90 on the entering side of the housing 89 supports a shaper mechanism indicated generally at 91 including upper and lower reciprocable rams 92 and 93 extending transversely of the slabs on one side of the welding zone. As best shown in Figures 14 and 15, the shaper mechanism is composed of upper and lower slides 94 and 95 gibbed to the column 90. The slides are machined to form guides 96 for the rams. The rams may conveniently be composed of a pair of channels welded flange to flange and smoothly finished to slide freely in the guides. The rams are driven by hydraulic motors 97. Each ram and its motor actually comprises a shaper unit. Each motor includes a barrel portion 98 formed on a plate 99 which overlies the ram guides, and a tube 100 extending laterally therefrom. Tie rods 101 extend through a cylinder head 102 and are threaded into the barrel 98 to hold the tube in assembled relation therewith. A piston rod 103 is reciprocable through a stuffing box 104 in the barrel 98 and is provided with a piston 105. The projecting end of the rod is reduced and extends through a head 106 on a pin 107 and is secured thereto by a through pin. The pin 107 extends through a block 108 in the forward end of the ram 92 and is secured therein by set screws 109.

The motor 97, including the barrel 98, tube 100, head 102 and piston 105, is double acting having pipe connections at opposite ends for admitting and exhausting fluid. The rod 103 extends beyond the piston 105 and is reduced as at 110 to enter a liner 111 with a small clearance, thus providing a dashpot action which cushions the return stroke of the rod. A sleeve 112 ahead of the piston has a similar effect at the end of the forward stroke.

The ram cylinders are interconnected so that one ram is being advanced while the other is being retracted. The rams are reversed by a suitable valve which will be described later, through the medium of a rocker arm 113 on a shaft 114 extending outwardly from the beam 90. Cam fingers 115 projecting from opposite ends of the arm 113 are adapted to be struck by laterally projecting bars 116 carried by the rams at their rear ends. The rocker arm is thus thrown from one position to the other as the rams alternately reach their forward positions so that continuous reciprocation thereof is maintained.

A toolholding block 117 is carried by each ram, being pivoted on a stud 118 projecting from the block 108 thereof. The block 117 has pockets for accommodating a parting tool 119 and a scarfing tool 120. The pockets are at an angle to each other so that the block may be swung from one alternate position to another for the two types of operation. The tools are secured in the pockets by set screws. A pin 121 extending from the block 108 cooperates with a slot 122 in the rear face of the block 117 to limit angular movement of the latter. The block is held in either of its operative positions by tightening a nut 123 threaded on the outer end of the stud 118. It will be noted from Figure 19 that when the scarfing tool is in operative position as shown in chain lines, it is somewhat to the left of the operative position of the parting tool as shown in solid lines. The purpose of this will appear later.

As shown in Figure 15, a vertical screw shaft 124 having its ends oppositely threaded cooperates with a nut 125 secured to the upper slide 94 and a nut 126 secured to the lower slide 95. Thus by driving the shaft 124, the slides with their rams may be caused to move toward or away from each other to feed the cutting tools toward the slabs and retract them therefrom. The shaft 124 is driven by a hydraulic motor 127. The motor operates a worm 129 and wormwheel 130 journaled in a housing 131 mounted on a bracket 128 extending downwardly from the bottom of the column 90. The motor 127 is secured to the housing. The wormwheel 130 is formed integral with pistons 132 and 133 reciprocable through a very short stroke in a cylinder 131a formed in the housing. A shaft 134 extending from the piston 133 is coupled to the lower end of shaft 124.

The pistons 132 and 133 serve to raise and lower both slides 94 and 95 simultaneously, thus advancing the tool of one shaper into operative engagement with the work and retracting the other tool to provide relief for its backward stroke. The pistons are operated by oil pressure so applied as to cause the shaft 124 to move vertically every time the rams reach the end of their stroke. It will be understood that movement of the shaft 124 is so coordinated with reciprocation of the rams that the ram which is being retracted will be moved away from the work and that which is being advanced will be moved into engagement with the work. The manner in which this is accomplished will be explained in detail later. In order to permit the slight axial movement of the wormwheel its working face is made a little wider than would otherwise be necessary, to main driving relation with the worm at all times.

(5) *The heating means* (Figs. 7, 13, 25 and 26)

The cylinders 62 and 63 have yokes 135 trunnioned to rings 136 thereon. The yokes are provided with elongated burners 137 extending across the width of the workpiece 13. These burners are of known construction and are bored longitudinally to provide gas passages for supplying a plurality of holes in the faces adjacent the slab. A hose 138 extends from a connection block 138 to each burner. The burner, being mounted for swinging movement by the construction just described, may be moved into the welding zone as shown in Fig. 25 or retracted out of the way of the shaper rams as shown in Fig. 7 during the operation of the latter.

A bar 140 is slidable in a guide plate 141 secured to the side of the frame 19 and has a slotted crossbar 140a secured to the end thereof. Pins 142 extending from the burners enter the slots in the crossbar whereby longitudinal movement of the bar 140 causes angular movement of the yokes 135 as illustrated in chain lines in Figure 25. The bar 140 has rack teeth formed on its lower edge meshing with a pinion 143 journaled in the guide plate and operated by a hand wheel 144.

(6) *The sequence of operations* (Figs. 27–30)

It will be apparent from the foregoing that the welder 11 is adapted by means of the various features already described to perform effectively the several steps necessary in joining successive slabs together end to end. These steps will be briefly reviewed here, before describing in detail the control system for performing them in proper sequence.

Figure 27:
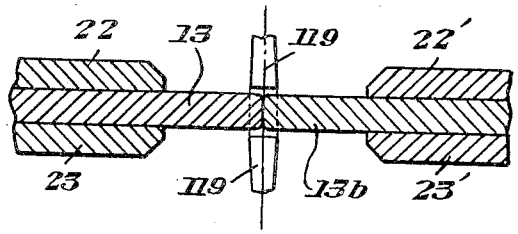
Figures 27 through 30 are longitudinal sections through the adjacent ends of successive slabs and the clamping members in which they are gripped, showing the several steps of the welding operation.

If it is assumed that a welding operation has just been completed, the first step is to return the car 12 from the position to which it was advanced while the welding operation was being performed, to the starting position indicated in chain lines in Figure 1. This is done, of course, by the motor 42 which is controlled by a manually operated valve specifically referred to hereinafter. The next step is to operate the hydraulic jacks 58, 61 of the stationary frame 18 to cause the jaws 23 to grip the workpiece 13 adjacent its trailing end as shown in Figure 27. This involves no difficulty since the workpiece ordinarily moves quite slowly, e. g., from 3 to 5 F. P. M. The next slab to be welded to the workpiece, i. e., one of those designated 13a, after being placed on the table 10 by the lift beam 32 and alined by the pusher 36, is advanced until the leading end abuts the trailing end of the workpiece 13. This succeeding slab is hereinafter designated 13b to conform to Figure 2. The jacks 58', 61' of the movable frame are then operated to cause the jaw 23' to grip the slab 13b adjacent its leading end. It will be understood that the rearward movement of the car after the preceding welding operation, is arrested at the proper point so that the trailing end of the workpiece, when gripped by the jaw 23, will be within the width of the parting tools 119 of the shapers.

Figure 28:
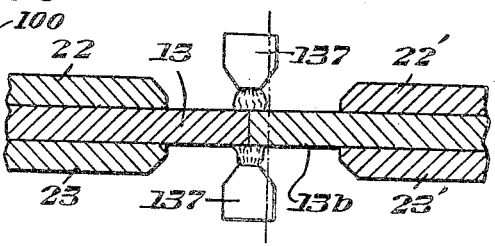

The shapers are then operated to cut through the slabs 13a and 13b from opposite sides, both shapers being raised and lowered at the end of each stroke, as described above and advanced toward each other as the cutting proceeds. When this operation has been completed, the adjacent ends of the slabs are finished to precisely parallel planes so that they will have uniform surface contact when abutted. After completion of the cut, both shaper rams are retracted and separated in preparation for the next operation thereof. The hydraulic motors 20 and 21 are then operated to advance the finished end of the slab 13b into abutment with the finished end of the workpiece 13, as shown in Figure 28. It will be noted that the jaws 22 and 23 occupy the same positions in Figures 27 and 28 but the jaws 22' and 23' have moved to the left in the latter, relative to the plane between the original abutting slab ends, indicated by a chain line in Figure 28. It will be understood, of course, that the car 12 actually moves with the continuously advancing workpiece 13 as soon as the jaws 22 grip the latter.

With the slabs 13a and 13b in abutment, as shown in Figure 28, they are ready to be heated to the proper temperature for welding, e. g., by the process of Renner Patent 2,231,027. To this end, the hand wheel 144 is operated to bring the burners 137 into the positions shown in Figures 25, 26 and 28. The burners, when ignited, project flames on the upper and lower surfaces of the slabs adjacent the joint and quickly raise the abutting edges to welding temperature. By reason of the cooling effect of the clamps 22, 23 and 22', 23', the heating is confined largely to the extreme ends of the slabs and the temperature across the width thereof is kept under proper control. If desired, the burners may be swung back and forth through a small angle during the heating stage, by appropriate operation of the hand wheel 144.

Figure 29:
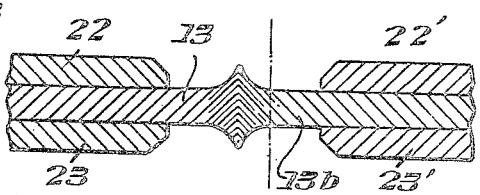

During the heating operation, the hydraulic motors 20 and 21 are caused to maintain a steady though moderate pressure of the slab 13b against the workpiece 13. When the abutting ends of the slab and workpiece have been raised to proper temperature for welding, an increased pressure is applied to the hydraulic motors to cause the final push-up necessary to complete the weld. The result is illustrated in Figure 29, i. e., the workpiece 13 and slab 13b have been united by a fusion weld accompanied by upsetting of the softened metal. Here again, the jaws 22 have the same relative position as before but the jaws 23 have moved toward them, as indicated by the chain line in Figure 29. When the weld is completed, the burners are retracted by operating the hand wheel and the weld is ready to be finished as soon as it has cooled. For this purpose, the tool-carrying blocks 117 are shifted to bring the scarfing tools 120 into operative position. The shapers are then operated to remove the flash from the weld as illustrated in Figure 30.

Figure 30:
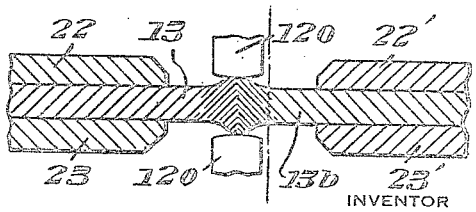

It will be noted that the central plane through the tools 120 in Figure 30 is spaced to the left of the central plane through the tools 119 in Figure 27, the tools are thus properly positioned for their respective operations, since the workpiece 13 is stationary throughout relative to the various operating instrumentalities while the slab 13b approaches it in two steps, i. e., after the initial cutting of the ends and during the push-up necessary to complete the weld. It is for this reason that the blocks 117 are arranged to place the operative position of the tools 120 to the left of the operative position of the tools 119. After the flash has been removed from the weld, and the shaper rams retracted, the clamping members 22 and 23 are released and the car is returned to the starting position by means of the drive 17 for the start of another complete cycle of clamping, machining, abutting, heating, welding and machining, all of which are performed successively as the car moves forward with the workpiece.

(7) *The hydraulic control system (Fig. 31)*

The piping connections between the pumps and the hydraulic motors for operating the various elements of the apparatus are shown only diagrammatically in Figure 31. They have been omitted from the other figures, for the most part, in order to avoid obscuring the mechanical construction shown therein. The elements shown in Figure 31 are designated by the same reference numerals as in the other figures.

The pumps 39 and 40 draw oil from the tank 38 (Fig. 4) and deliver it under pressure to the various hydraulic motors through distribution piping under the control of suitable valves. Each valve has a connection to its motor and a return pipe leading to the tank. The return pipes have been omitted from Fig. 31 to avoid unnecessary complexity of the drawing but are indicated by arrows leading away from the valves. Conversely, arrows leading to the pumps 39 and 40 indicate connections from the tank.

The pump 39 delivers oil, preferably under a relatively high pressure, i. e., 1000 lbs. per square inch, to a main supply pipe 145. An accumulator 146 is connected to this pipe to supply large short-time demands beyond the capacity of the pump. The pump 40 delivers oil under a lower pressure, i. e., 400 lbs. per square inch. By means of a four-way open-center valve 147, the output of the pump 40 may be delivered to the car motor 42 or the shaper motors 97. A four-way open-center reversing valve 148 between the valve 147 and the car motor permits the latter to be operated in either direction, although it will normally be used only to return the car in a direction opposite that in which the workpiece travels. Slight forward movement of the car by the motor may be desirable, however, for properly spotting the clamping members of the fixed frame relative to the trailing end of the workpiece. In any event, the shaper motors will be idle when the car motor is being operated.

Oil supplied to the shaper motors when the valve 147 is appropriately manipulated passes through a volume-control device 149. This is simply a throttle valve constructed to provide a constant flow at a rate which may be adjusted. Such devices are already well known and no detailed description thereof is required. Oil is admitted alternately to the motors 97 by a four-way, tapered-spool reversing valve 150. This valve is pilot-operated by a hydraulic motor 151 controlled in turn by a four-way, closed-center reversing valve 152. Pilot-operated valves of this type are also well known. The valve 152, preferably of the piston type as shown in Figures 4, 5 and 6, is operated by the rock shaft 114 by means of a crank 153 pivoted to the reciprocable valve piston.

The valve 150, as shown, serves alternately to admit oil under pressure to one motor 97, viz., the lower one in the position shown, and exhaust oil from the other. A cross connection 154 between the rod ends of the cylinders causes the oil in front of the piston in the lower cylinder, on being displaced, to be effective to retract the piston in the upper cylinder and vice versa. Alternate reciprocation of the pistons is thus insured, the valve 150 being reversed between successive strokes. A branch 155 communicates with the connection 154 for a purpose which will appear shortly, but is normally closed by a check valve 156 and a relief valve 157 so that the branch has no effect on the normal operation of the shaper motors.

The pump 39 delivers oil through the main supply pipe 145 for operating the cylinder 81 of the slab-centering device. The flow of oil to opposite ends of the cylinder is controlled by a four-way, closed-center valve 158. Valves 159 and 160 control the admission of oil to cylinders 58 and 58' of the stationary and movable frames, respectively, only one cylinder of each frame being shown in Fig. 31. A valve 161 controls the supply of oil to the cylinders 68 and 70 of the hydraulic motors 20 and 21. As shown in Fig. 4, valves 159, 160 and 161 are of the multiple unit type. They are of the four-way, closed center type, to prevent draining of the accumulator.

When the valve 161 is in the illustrated position, it admits oil to the cylinders 70 for restoring the movable frame to starting position. When turned to the alternate position, the valve supplies oil to the cylinders 68 through a reducing valve 162. The motors 20 and 21 thus initially exert a moderate force urging the slab 13b against the workpiece 13. When the heating of their abutting ends has progressed sufficiently that the softening of the metal permits the push-up to commence, a shut-off valve 163 is operated to open a by-pass 164 around the reducing valve 162, thereby admitting oil under full pressure to the cylinders and effecting a final push-up under increased pressure. The valve 163, as shown in Figure 5, is operated by a spring-pressed push-rod 165 carried on the side plate 45' of the movable frame and extending through the side plate 44 of the stationary frame. The length of the rod, of course, is such that the valve 163 will be opened at the proper point in the travel of the movable frame toward the stationary frame, i. e., after the initial upsetting of the heated abutting ends of the slab and workpiece.

By-pass 164 also supplies oil under high pressure through branch 155 to connection 154 for retracting the pistons of both shaper motors 97. This takes place automatically at the proper time in the operation sequence. When the motors 20 and 21 are first operated to cause the slab and workpiece to abut after the initial machining operation, high-pressure oil is admitted to the rod ends of the motors 97 (the head ends thereof being connected to the tank at this stage since the valve 147 is of the open-center type), thus forcing them back and holding both pistons in their rearmost positions so long as the valve 161 is turned to supply oil to the cylinders 68.

When the valve 161 is moved back to the illustrated position, and valve 147 is moved to pressure position, the one of the motors 97 which happens to be connected to the supply line, depending on the position in which valve 150 was left, is moved forward. The oil in front of that piston is returned to the tank through relief valve 157. This valve is set to open at a pressure above that existing in the connection 154 during normal operation of the shaper motors. When normal pressure is applied to one motor through the valve 150, however, a higher pressure is built up ahead of the piston therein because of the difference between the areas exposed on opposite sides of the piston.

The feed-screw motor 127 is operated by oil from supply pipe 145 under the control of a four-way, closed-center reversing valve 166. A connection 167 from the supply pipe 145 admits high-pressure oil to the top of the cylinder in housing 131 at all times. A connection 168 branching from the pipe to the lower cylinder of valve motor 151 admits high-pressure oil to the bottom of the cylinder 131 when the lower ram motor is executing a forward stroke. The simultaneous raising and lowering of the shapers is thus automatically coordinated with the forward movement and retraction of the rams. The high-pressure oil supplied to the lower end of the cylinder in housing 131 overcomes the force exerted by the high-pressure oil in the upper end thereof and also the weight of the shaper assembly, because of the difference between the areas exposed on opposite sides of the piston.

The speed of the screw motor 127 when operating normally to bring the shapers together is controlled by a volume-control device 169 similar to that shown in 149. In order to speed up the operation of the screw when separating the shapers after the completion of an initial or a flash-trimming cut, a three-way by-pass valve 170 is connected in series with the volume control unit 169. It is pilot-operated by a motor 171 when the valve 147 is turned to cause operation of the shapers. The motor 171 has a restoring spring for returning the valve 170 to normal position. It is illustrated in the position in which it by-passes the unit 169. As above stated, this provides rapid traverse of the shaper feed for separating the shapers. Pilot motor 171 causes oil to be metered through unit 169, when valve 147 supplies oil under pressure to the shapers. Unit 169 may be by-passed and rapid traverse obtained only when the shapers are idle.

The oil supplied to reversing valve 152 for operating the shaper-reversing valve and the feed-screw lift cylinder 131 is obtained from supply pipe 145 through a connection 172 tapped from the connection between valve 160 and cylinder 58'. Operation of the shaper motors is possible therefore, only after the cylinders 58' have been operated to clamp the slab 13b.

(8) The centralized control (Figs. 4–7)

The control of the various valves is centralized on a panel 173 carried on the stationary frame 18 within easy reach of the operator's position on the car indicated at 174. As best shown in Figures 4 and 5, the valves 147, 148, 159, 160 and 161 are operated in a predetermined sequence by cams 175 on a shaft 176. The cams operate followers 177 having links passing between guide bars 178. The shaft 176 is operated by a control handle 179 through gears 180. The cams are so shaped that movement of the handle through various positions corresponding to successive steps causes proper operation of the valves. Valve 166 is controlled by a rock shaft 181 and a lever 182. The volume-control unit 149 is actuated by a knob 183 through a shaft 184 and a chain-and-sprocket drive 185. The unit 169 is controlled by a knob 186 through a shaft 187.

The sequence effected by turning the handle 179 is as follows:

| Position No. | Operation |
| --- | --- |
| 0 | Car Motor Reversed ⎫ Clamping Members of Stationary and Movable Frames Released. Shapers Idle. |
| 1 | Car Motor Neutral ⎬ |
| 2 | ...do... ⎭ |
| 3 | Clamping Members of Stationary Frame Engaged—Shapers Idle. |
| 4 | Clamping Members of Movable Frame Engaged—Shapers ready to operate. |
| 5 | Shapers Operate. |
| 6 | Shapers Retracted. |
| 7 | Push Up under low and high pressure (Shapers remain retracted). |

When the push-up has been completed, the shapers may be operated for flash trimming by throwing the cam shaft back two positions, after shifting the shaper tools. When the flash trimming operation is complete, a subsequent advance of the cam shaft will cause the shapers to be retracted after which the cam shaft may be advanced rapidly to the "0" position for releasing the clamping jaws and bringing the car back to the starting point. The shapers remain retracted only if position 5 is passed through rapidly on the way back.

(9) The cooling system and fuel supply (Figs. 32–34)

It will be apparent from the foregoing that the heating of the ends of the slabs preparatory to welding is effected progressively from the exterior thereof toward the interior. Cooling of the weld after it is complete occurs similarly. Thus during both the heating and cooling, there will be a temperature gradient from the surface of the slabs toward the median plane therethrough. This temperature gradient results in differential thermal expansion setting up internal stress and may tend to cause actual deformation such as buckling. If such deformation were permitted to occur, it would be seriously detrimental to the character of the weld. In addition, variations in temperature across the width of the slabs may develop during heating or cooling, introducing further internal stress and tendency to deformation.

I provide novel means for effecting a controlled cooling of the slabs adjacent the ends to be welded, throughout the entire welding cycle of operations, and thus limit the internal stress resulting from differential expansion to an insignificant minimum and prevent deformation of the slabs. To this end, the clamps 22, 23 and 22', 23' extend inwardly from the frames 18 and 19 and terminate closely adjacent the welding zone, as clearly shown in Figures 27 through 30. The clamps have approximately the same width as the slabs to be welded, as shown in Figure 9 and thus tend to exert a marked cooling effect on the metal of the slabs except at the extreme ends thereof to which the heating flame is directly applied. The clamps are maintained at substantially uniform temperature by the cooling system now to be described. It will be understood, of course, that the cooling system prevents overheating of the various parts of the apparatus and mechanical injury which might result therefrom but this is secondary. The principal purpose is to improve the quality of the finished welded joint by maintaining controlled cooling throughout the entire cycle of operations.

The end of the base 38 immediately beneath the stationary frame 18 is partitioned off to form a reservoir 188 for cooling water. A pump 189 on the floor of the car 12 is driven by a motor 190. The pump draws water from the tank 188 through a connection 191 and discharges it through a pipe line 192 to a fitting 193. From one branch of the fitting, a connection 194 leads to the cooling jacket 62a on the cylinder 62 of the hydraulic motor 20. An outlet connection 195 from the water jacket discharges into the space between the plates 48 and 49 of frame 18.

A hose 196 extends from the fitting 193 to the space between the lower clamping member 23 and the transverse horizontal plate 51a of the crosshead 51. A hose 197 extends from the other end of this space to a block 198. A hose 199 extends from the block 198 to the upper burner making connections with block 139 from which pipes 200 extend to the inlet and outlet of the water passage through the burner. A return hose 201 extends from block 139 through the block 198 to the space between the plates 48 and 49 of frame 18. The water accumulating in this space overflows through an outlet 202 and a connection 203 to the space between the plates 59 and 60 of frame 18 through an inlet 204. An overflow pipe 205 returns the water from this space to the tank 188. It will be apparent from the foregoing that a portion of the cooling water is supplied to the water jacket 62a while another portion is delivered in succession through the crosshead 51, the upper burner, the space above the upper clamping member 22 and, finally, the space surrounding the cylinders 58.

Cooling water is also supplied from the fitting 193 through a hose 206 to the movable frame 19. After passing through the crosshead 51', the water flows to the lower burner through a hose 207 and from the latter through a hose 208 and thence to the space between the plates 48' and 49'. From the latter, it flows through a vertical connection 209 similar to that shown at 203, to the space between the plates 59' and 60' and thence through an overflow pipe 210 into a cup 211. A connection 212 from the latter returns the water to the tank 188. The cup 211 is large enough in the direction of movement of the frame 19 to receive water from the pipe 210 in all positions of the frame.

Oxygen and acetylene are supplied from the tanks 28 and 29 through the hose 24 to a block 213 on the frame 19. Connections 214 extend from the block to hoses 215 extending to the block 139 of the upper burner. Similarly, connections 216 communicate with hoses 217 extending to the lower burner.

(10) *The advantages of the invention*

It will be apparent from the foregoing that my invention provides a method and apparatus particularly suited for welding together successive slabs of such thickness that they do not bend to make possible the formation of a loop of slack, while in continuous motion toward and through a processing line. The invention provides means for clamping the ends of the slabs to be welded within a definite welding zone and means adapted to enter said zone for accurately machining the ends preparatory to welding. The invention also includes means movable into and out of the welding zone for heating the ends and means for actuating the clamping members to effect a "push-up" of the heated ends to complete the weld.

The machining means has provision for cutting off the slab ends preparatory to welding as well as removing the flash and finishing the weld after cooling thereof. The newly added slab moves toward the previously formed workpiece after the initial machining and during the push-up. The operative position of the tool used for flash trimming is accordingly fixed in a location appropriately displaced horizontally from that of the tool for cutting off the ends of the slabs. Positive control of the relative positions of the slab ends is maintained at all times after the initial clamping operation. The surfaces to be welded together are abutted immediately after the initial machining so that only fresh, clean metal free from oxide is involved in the weld.

The apparatus and method of my invention permit the welding of slabs of considerable thickness and the finishing of the weld in a time sufficiently short so that the car on which the apparatus is mounted does not travel an excessive distance at the rate at which the workpiece is usually fed forward. The invention also makes feasible the welding of slabs having a limited length such that the locations of the welds in the workpiece are relatively close together.

My invention also provides centralized control means which is an important factor contributing to the carrying out of the several operations swiftly and in proper sequence, with a minimum of attendance and manual effort. The amount of scrap produced by the preliminary machining operation is relatively slight. The weld, when completed, is fully as strong as the parent metal and may be processed in the same manner as the later. The controlled cooling applied to the slabs adjacent the welding zone during both the heating of the ends to be welded and the cooling of the completed weld, limits the difference between the temperatures at various points across the width of the slab and through the thickness thereof to values such that differential expansion and contraction do not set up objectionable internal stress or cause actual deformation. While the cooling effect of the clamping members is continuous it does not prevent or unduly delay the heating of the abutting ends of the slabs to welding temperature. As soon as the heating is terminated and the weld completed, the cooling effect of the clamping members comes into play to cause rapid cooling of the weld at a rate which is substantially uniform throughout the width of the slabs.

While the invention has been described with particular reference to a specific method of welding, it is to be noted that other welding methods may be employed. The nature of the preliminary machining operation on the ends of the slabs will depend on the type of welding to be performed. In the case of arc or gas welding, for example, the slab ends to be joined are preferably machined to provide a V-shaped groove to accommodate the welding metal.

Although I have illustrated and described but a preferred embodiment and practice of my invention, it will be recognized that changes in the details of the construction or procedure may be made without departing from the spirit of the invention or the scope of the appended claims.

I claim:

1. In a machine for welding successive slabs into a continuous plate and flash trimming said plate during the uninterrupted movement of such slabs and plate in their processing line, in combination, a vehicle adapted to reciprocate between two substantially fixed points in said line along which said slabs and plate move in endwise relation, a fixed frame on said vehicle, a transom fixed to said frame and extending across said line, a crosshead connected to said frame in movable relation to said transom, said crosshead also extending across said line, clamping jaws respectively connected to said transom and said crosshead, longitudinally extending hydraulic cylinders mounted in said frame, piston rods in said cylinder, a movable frame rigidly connected to said piston rods, a second transom fixed to said movable frame and extending across said line, a second crosshead connected to said movable frame in movable relation to said second transom, said second crosshead also extending across said line, clamping jaws respectively connected to said second transom and said second crosshead, said sets of clamping jaws being respectively adapted to engage the trailing end of said plate and the leading edge of a succeeding slab and to hold the same in endwise abutting relationship, said clamping jaws engaging the trailing end of said plate being so adapted to move said vehicle in the direction of movement of said processing line, means for retracting said piston rods to effect approaching movement between said frames and between said plate and said slab during said welding operation, and means for extending said piston rods upon completion of said welding and trimming and the unclamping of said clamping jaws as the most forwardly point in the movement of said vehicle is reached, and means for returning said vehicle to its point of origin.

2. In a machine for welding successive slabs into a continuous plate and flash trimming said plate during the uninterrupted movement of said slabs and plate in their processing line, in combination, a vehicle adapted to reciprocate between two substantially fixed points in said line along which said slabs and plate move in endwise relation, a fixed frame on said vehicle, a transom fixed to said frame and extending across said line, a crosshead connected to said frame in movable relation to said transom, said crosshead also extending across said line, clamping jaws respectively connected to said transom and said crosshead, said clamping jaws adapted to engage the trailing end of said plate and to move said vehicle in the direction of movement of said processing line, longitudinally extending double acting hydraulic cylinders mounted in said frame, rearwardly extending piston rods in said cylinders, a movable frame rigidly connected to said piston rods, a second transom fixed to said movable frame and extending across said line, a second crosshead connected to said movable frame in movable relation to said second transom, said second crosshead also extending across said line, clamping jaws respectively connected to said second transom and said second crosshead, said last-mentioned clamping jaws being adapted to engage the leading edge of a succeeding slab, a piston connected to each of said piston rods and adapted to successively move said leading edge of said slab into abutting relation with said trailing edge of said plate and then to effect further approaching movement between said slab and said plate during said welding operation, a smaller piston on each of said piston rods adapted to move said movable frame away from said fixed frame after said welding and trimming has been completed and said clamping jaws unclamped as the most forwardly point in the movement of said vehicle is reached, and means for returning said vehicle to its point of origin.

3. In a machine for welding successive slabs into a continuous plate and flash trimming said plate during the uninterrupted movement of such slabs and plate in their processing line, in combination, a vehicle adapted to reciprocate between two substantially fixed points in said line along which said slabs and plate move in endwise relation, a fixed frame on said vehicle, a transom fixed to said frame and extending across said line, a crosshead connected to said frame beneath said transom and in movable relation thereto, said crosshead also extending across said line, clamping jaws respectively connected to said transom and said crosshead, said clamping jaws adapted to engage the trailing end of said plate and to move said vehicle in the direction of movement of said processing line, rearwardly extending double acting hydraulic cylinders mounted in said frame, rearwardly extending piston rods in said cylinders, a movable frame rigidly connected to said piston rods, a second transom fixed to said movable frame and extending across said line, a second crosshead connected to said movable frame beneath said second transom and in movable relation thereto, said second crosshead also extending across said line, clamping jaws respectively connected to said second transom and said second crosshead, said last-mentioned clamping jaws being adapted to engage the leading edge of a succeeding slab, a piston connected to each of said piston rods and adapted to successively move said leading edge of said slab respectively into abutting relation and then into weld push-up relation with said trailing edge of said plate, hydraulic valve means connected to said pistons to increase the pressure on said pistons during said weld push-up movement, a chamber associated with each of said clamping jaws adapted to maintain said jaws and said portions of said slab and plate engaged thereby at non-injurious temperatures during said welding operation by the circulation of cooling fluid therein, means for unclamping said clamping jaws as the most forwardly point in the movement of said vehicle is reached and after said welding and trimming has been completed, a smaller piston on each of said piston rods adapted to move said movable frame away from said fixed frame after said clamping jaws have been unclamped, and means for returning said vehicle to its point of origin.

PAUL M. MUELLER.

REFERENCES CITED

The following references are of record in the file of this patent:

UNITED STATES PATENTS

| Number | Name | Date |
|---|---|---|
| 964,640 | Goldschmidt et al. | July 19, 1910 |
| 1,343,346 | Buckley | June 15, 1920 |
| 1,489,153 | Robinoff | Apr. 1, 1924 |
| 1,542,805 | Hathaway | June 16, 1925 |
| 1,666,020 | Menne | Apr. 10, 1928 |
| 1,677,874 | Smith | July 17, 1928 |
| 1,876,290 | Hanna | Sept. 6, 1932 |
| 1,881,761 | Lougheed | Oct. 11, 1932 |
| 1,901,514 | Herman et al. | Mar. 14, 1933 |
| 1,930,642 | Clark | Oct. 17, 1933 |
| 1,968,442 | Clark et al. | July 31, 1934 |
| 2,078,365 | Biggert et al. | Apr. 27, 1937 |
| 2,115,414 | Davis | Apr. 26, 1938 |
| 2,120,316 | Stone | June 14, 1938 |
| 2,143,969 | Biggert | Jan. 17, 1939 |
| 2,316,871 | Jackson | Apr. 20, 1943 |
| 2,350,716 | Bissout et al. | June 6, 1944 |

Certificate of Correction

Patent No. 2,533,605 December 12, 1950

PAUL M. MUELLER

It is hereby certified that error appears in the printed specification of the above numbered patent requiring correction as follows:

Column 6, line 44, for "tmperature" read *temperature*; column 7, line 53, for the word "toolholding" read *tool-holding*; column 8, line 35, for "main" read *maintain*; lines 46 and 47, for "block 138" read *block 139*; column 15, line 60, for "later" read *latter*;

and that the said Letters Patent should be read as corrected above, so that the same may conform to the record of the case in the Patent Office.

Signed and sealed this 13th day of March, A. D. 1951.

[SEAL]

THOMAS F. MURPHY,
*Assistant Commissioner of Patents.*